United States Patent [19]

Kuwako et al.

[11] 4,214,180
[45] Jul. 22, 1980

[54] MINIATURE ELECTRIC MOTOR EMPLOYING A CONVERSION MECHANISM FOR LINEAR MOVEMENT

[75] Inventors: Tomohisa Kuwako, Anjo; Takashi Ozaki; Yoshitaka Iwase, both of Nagoya, all of Japan

[73] Assignee: Kabushiki Kaisha Tokai Rika Denki Seisakusho, Aichi, Japan

[21] Appl. No.: 889,449

[22] Filed: Mar. 23, 1978

[51] Int. Cl.² ............................................. H02K 7/00
[52] U.S. Cl. ...................................... 310/80; 310/83; 310/112
[58] Field of Search ........ 310/112, 119, 126, 162–165, 310/40 MM, 80, 83

[56] References Cited

U.S. PATENT DOCUMENTS

| | | | |
|---|---|---|---|
| 2,366,239 | 1/1945 | McCoy | 310/83 UX |
| 3,159,758 | 12/1964 | Hemperly, Jr. et al. | 310/83 |
| 3,165,656 | 1/1965 | Korthaus et al. | 310/83 X |
| 3,984,709 | 10/1976 | Kuwako et al. | 310/40 MM |
| 4,048,531 | 9/1977 | Buess et al. | 310/83 X |

*Primary Examiner*—Donovan F. Duggan
*Attorney, Agent, or Firm*—Wenderoth, Lind & Ponack

[57] ABSTRACT

A miniature electric motor including a shaft, at least one rotor coaxially mounted on the shaft and having a plurality of pole teeth angularly spaced from each other, at least one permanent magnet stator magnetized to provide north and south poles alternating at angular spacings corresponding to the angular spacings of the pole teeth, at least one annular exciting coil, and a yoke member made of magnetic material. The yoke member, exciting coil and stator are positioned relative to the rotor so that a magnetic flux developed by the exciting coil combines with the pole teeth of the rotor to form a magnetic loop. The motor further includes a motion translating mechanism located between the rotor and the shaft for converting the rotation of the rotor into a linear movement of the shaft.

5 Claims, 7 Drawing Figures

4,214,180

MINIATURE ELECTRIC MOTOR EMPLOYING A CONVERSION MECHANISM FOR LINEAR MOVEMENT

BACKGROUND OF THE INVENTION

The present invention relates to an electric motor and, more particularly, to a miniature electric motor having a motion translator mechanism built in for converting the rotary motion of the rotor into a linear movement.

U.S. Pat. No. 3,984,709, which issued to the same inventor on Oct. 5, 1976, and is assigned to the same assignee of the present invention, discloses a miniature electric motor which comprises a substantially cylindrical casing of soft magnetic material having one end closed, a power output shaft rotatably extending through the closed end of the casing in coaxial relation to the casing, at least one rotor of soft magnetic material rigidly mounted on the power output shaft within the casing, a stator having the form of an annular permanent magnet and magnetized around its circumference to provide alternating north and south poles at equal angular spacings and rigidly mounted on a support base which additionally serves as a closure for closing the opening at the other end of the casing, a yoke member of soft magnetic material cooperating with the casing to form an alternating magnetic circuit with the rotor, and an annular exciting coil is housed within the casing in coaxial relation to the power output shaft and positioned adjacent to the rotor and the outside rotor boss and the yoke member.

The rotor has a flat circular portion lying in a radial plane perpendicular to the longitudingal axia of the power output shaft and facing the magnetized face of the permanent magnet stator, and also has a plurality of polarizable teeth in angularly equally spaced relation to each other. The yoke member, exciting coil and permanent magnet stator are positioned relative to the rotor so that a magnetic flux developed by the exciting coil, when the latter is energized, combines with the above described elements to form a magnetic loop with the polarizable teeth. Consequently the adjacent polarizable teeth on the rotor are magnetized in opposite polarities in response to the magnetic field produced by the energized exciting coil, the polarity of each of the polarizable teeth alternating in response to alternation of the magnetic field.

The electric motor described above and disclosed in the previously mentioned U.S. Patent is satisfactory in that the power output shaft can be precisely rotated through a desired angular displacement in response to a train of pulses applied to the exciting coil, each of the pulses representing a specifically defined displacement of the rotor. However, when the electric motor of the above described construction is applied to move an element in a linear direction, it is required that the driven element be coupled to the power output shaft of the electric motor through a motion translator which is generally composed of a rack and pinion.

The employment of the motion translator of rack-and-pinion construction not only increases the size and manufacturing cost of the drive unit as a whole including the electric motor, but also poses the problem of backlash which tends to occur between the pinion and the rack.

An alternative to an electric motor combined with an external motion translator for moving a driven element in a linear direction is a solenoid operated plunger. However, because of its operation, the solenoid operated plunger cannot be employed in applications in which the driven element is desired to be precisely stepped in a linear direction and, therefore, such a solenoid operated plunger cannot be employed as a substitute for an electric motor combined with an external motion translator.

SUMMARY OF THE INVENTION

Accordingly, an object of the present invention is to substantially eliminate the above described disadvantages and inconveniences and to provide an improved electric motor having a built-in motion translator, the use of the motion translator substantially resulting in no increase in size and manufacturing cost of the motor.

Another object of the present invention is to provide an improved electric motor of the type referred to above, wherein a power output shaft undergoes a linear motion in an axial direction towards and away from the motor without any substantial possibility of accompanying backlash.

A further object of the present invention is to provide an improved electric motor of the type referred to above, wherein, depending upon the number of electric pulses used to energize an exciting coil of the motor, the linear movement of the power output shaft can precisely be controlled over the designed maximum stroke of movement of the power output shaft.

The electric motor of the present invention comprises a power output shaft which is axially supported in movable relation in a housing, at least one rotor having an annular flat body, a plurality of poles located on the annular flat body and angularly spaced around the circumference of the annular flat body, at least one permanent magnet stator magnetized to provide north and south poles alternating at angular spacings corresponding to each of the angularly spaced poles of the rotor, at least one annular exciting coil, and a yoke member of soft magnetic material, said yoke member, exciting coil and permanent magnet stator being positioned relative to the rotor so that when a magnetic flux is developed by the exciting coil, when the latter is energized, the previously named elements combine with the poles on the flat body of the rotor to form a magnetic loop.

In accordance with the teachings of the present invention, the electric motor of the present invention is provided with a motion translator operatively mounted within the motor housing and comprising means operatively interposed between the rotor and the power output shaft and in coaxial relation to the longitudinal axis of the power output shaft and the axis of rotation of the rotor within the motor housing for transmitting the rotary motion of the rotor to the power output shaft to cause the latter to move in a direction perpendicular to the plane of rotation of the rotor, and means for suppressing the rotation of the power output shaft relative to the rotor.

In a preferred embodiment of the present invention, the motion transmitting means referred to above is composed of a sleeve means rigidly mounted on the rotor in coaxial relation thereto and having an axially extending helically threaded bore, and a helical thread on the outer periphery of at least one end portion of the power output shaft and on which the sleeve means is mounted on the threaded end portion of the power output shaft with the thread in the bore of the sleeve means meshed with the thread on the outer periphery of the end portion of the power output shaft. The suppressing means referred to above is composed of a bearing member having an axial bearing bore having a circular cross section so with the other end portion of the power output shaft extending through the circularly shaped bearing bore in the bearing member and the other end of the shaft having a cross section which is complemental to that of the bearing bore in the bearing member.

Alternatively, the suppressing means may include a key shaped portion on the other end of the shaft and a corresponding groove which is in the wall defining the bore of the bearing member and the outer periphery of the other end portion of the power output shaft for preventing the other end of the shaft from rotating.

BRIEF DESCRIPTION OF THE DRAWINGS

The foregoing and other objects and advantages of the present invention will be readily apparent to those skilled in the art from the following description taken together with the accompanying drawings, in which.

DETAILED DESCRIPTION OF THE INVENTION

Figure 1:
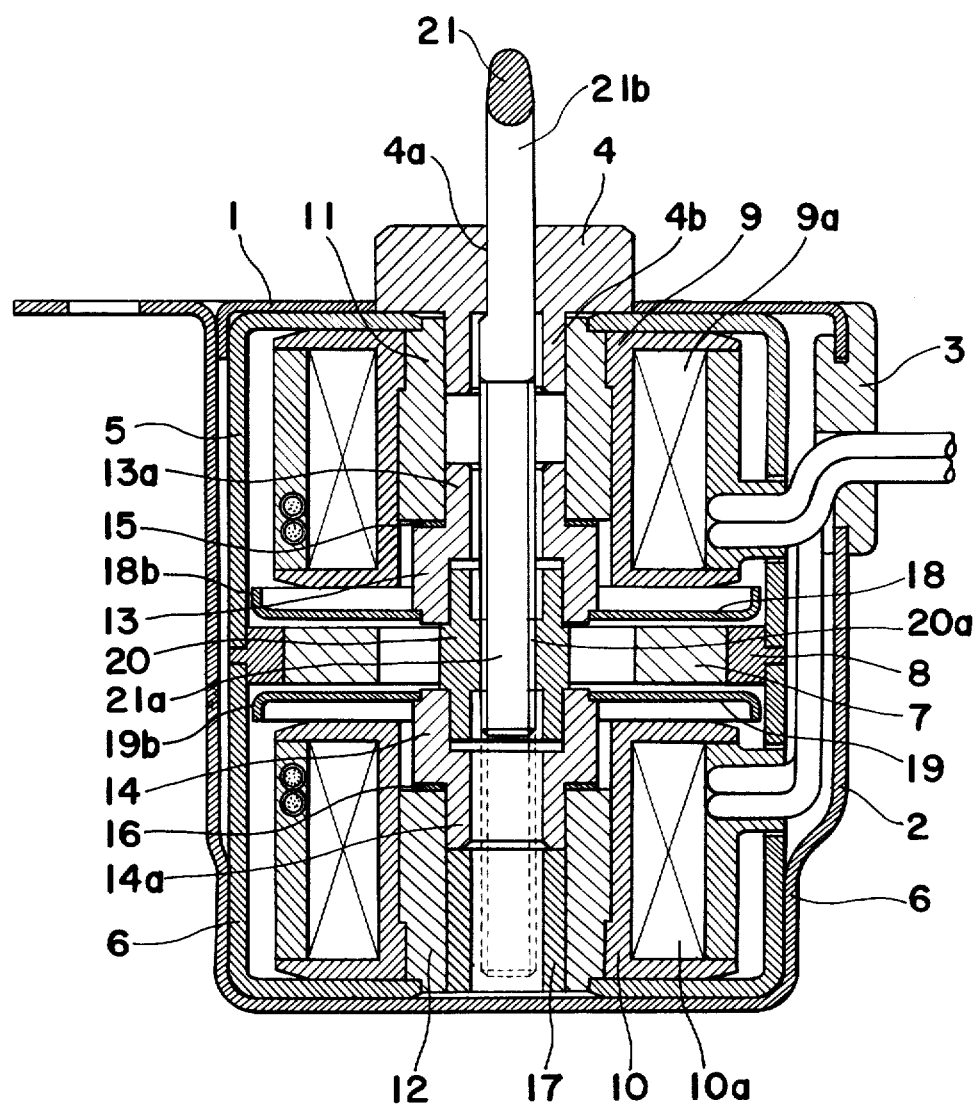
FIG. 1 is a longitudinal sectional view of an improved electric motor assembly embodying the present inveiton.

Before proceeding with the description of the present invention, it is to be noted that like parts are designated by like reference numerals throughout the accompanying drawings. In addition, it is also to be noted that although the miniature electric motor embodying the present invention may have at least one rotor, at least one permanent magnet stator and at least one exciting coil as hereinbefore described, following description is directed to an electric motor having two rotors, one permanent magnet stator and two exciting coils.

Figure 2:
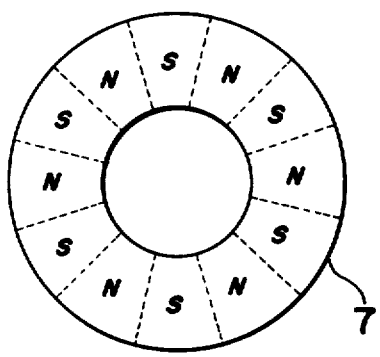
FIG. 2 is a top plan view of a permanent magnet stator employed in the motor assembly shown in FIG. 1.
Figure 3:
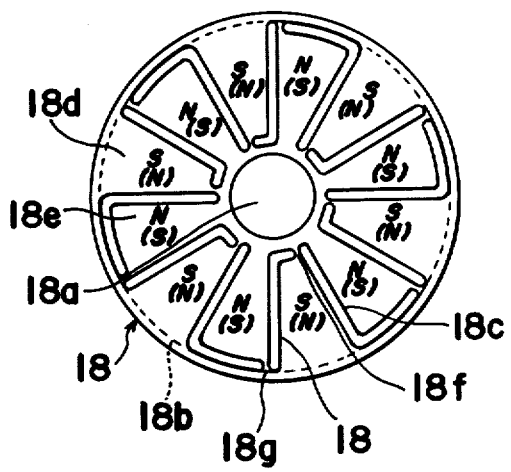
FIG. 3 is a top plan view of one of rotors employed in the motor assembly shown in FIG. 1.

Referring first to FIGS. 1 to 3, a miniature electric motor assembly as best shown in FIG. 1 comprises an outer casing structure made of soft magnetic material and is composed of a substantially circular lid 1 and a substantially cylindrical outer casing 2, similar in shape to a container, having one end opened and closed by the lid 1. The outer casing 2 has an elastic cushioning bushing 3 which is received in a hole in the outer casing 2 and through which the power supply conductors from exciting coils 9a and 10a extend out of the outer casing structure. The lid 1 has a shaft bearing 4, preferably an oil-impregnated bearing, rigidly mounted in a central hole defined in the lid 1 and having an annular protrusion 4b extending into the interior of the outer casing structure. The bearing 4 has an axial bore 4a coaxial with the hole of the annular protrusion 4b and has a cross sectional wherein at least one portion of the wall defining the bore 4a is flattened with the flattened portion extending over the entire length of the bore 4a.

The outer casing structure which is composed of the lid 1 and the outer casing 2, accommodates an inner casing structure therein which is made of soft magnetic material and composed of upper and lower casings 5 and 6 having substantially similar constructions, each of the casings having the form of a container with one end closed and the other end open. The inner casing structure is accommodated in position within the interior of the outer casing structure with the open ends of the respective upper and lower casings 5 and 6 facing each other and holding a retainer ring 8 in position between them while the closed ends of the respective upper and lower casings 5 and 6 are held tightly against the lid 1 and the bottom of the outer casing 2. The retainer ring 8 is made of magnetically insulating material and supports an annular permanent magnet stator 7 in coaxial relation to the longitudinal axis of the bore 4a in the bearing 4.

As best shown in FIG. 2, the annular permanent magnet stator 7 is manufactured by arranging a plurality of permanent magnets in the form of a ring and arranged so that their north and south poles alternate at equal angular spacings around the circumference or the entire stator.

The exciting coils 9a and 10a are respectively wound around coil bobbins 9 and 10, which are respectively housed within the upper and lower casings 5 and 6 in coaxial relation to each other and also to the longitudinal axis of a shaft 21 which extends through the bore 4a in the bearing 4 as will be described later. These coils 9a and 10a on the respective coil bobbins 9 and 10 are preferably externally coated with protective and insulating layers of synthetic resin. Each of the exciting coils 9a and 10a has an intermediate tap extending outwards from an intermediate point along the length of the coil wire as will be described later with particular reference to FIG. 4.

The coil bobbins 9 and 10 have respective center yoke members 11 and 12, each having the form of a sleeve and made of soft magnetic material such as iron, on which the bobbins 9 and 10 are rigidly mounted. These center yoke members 11 and 12 also serve as bearing members and are preferably made of a sintered soft magnetic material having an oil retention capability. In the assembled construction as shown in FIG. 1, the center yoke member 11 receives the annular protrusion 4b of the bearing 4 which extends through the closed end of the upper casing 5 into the bore of the yoke member 11 as shown. On the other hand, the yoke member 12 is held in position at the bottom of the lower casing 6 in alignment with the longitudinal axis of the shaft 21 with its lower end received in an opening located in the bottom of the lower casing 6 as shown.

Positioned between the yoke members 11 and 12 are rotor bosses 13 and 14 and an internally threaded sleeve 20 forming a part of a motion translator mechanism. Each of the rotor bosses 13 and 14 has an outer diameter reduced at one end portion thereof to provide a diameter end 13a or 14a. In addition, an axially extending bore in each of the rotor bosses 13 and 14 has one end, opposite to the reduced diameter end 13a or 14a, which is enlarged in diameter and into which a corresponding end of the sleeve 20 is tightly inserted. Preferably, these rotor bosses 13 and 14 and the sleeve 20 are made of a soft magnetic material having an oil retention capability.

It is to be noted that the rotor bosses 13 and 14 and the sleeve 20 may be of one-piece construction or, specifically, may be composed of a single hollow cylindrical member.

Ring washers 15 and 16 are interposed between the annular end faces of the associated yoke members 11 and 12 which are adjacent to the corresponding rotor bosses 13 and 14 and annular stepped portions where the outer peripheries of the rotor bosses 13 and 14 are radially inwardly stepped to provide the reduced ends 13a and 14a, respectively. Accommodated within the bore of the yoke member 12 and positioned between the other annular end face of the rotor boss 14 remote from the sleeve 20 and the bottom of the outer casing 2 is an oil impregnated sleeve member 17 made of felt or any other metallic or synthetic resin having an oil retention capability. This sleeve member 17 may not always be necessary, but if it is employed as shown the axially extending bore of the sleeve member 17 should have a diameter greater than the maximum diameter of the power output shaft 21, depending upon the desired or required distance of movement of the shaft 21.

The sleeve 20 has its inner peripheral wall threaded as shown at 20a. On the other hand, the power output shaft 21 has one end portion 21a externally threaded and extending through the threaded bore 20a of the sleeve 20 which is located at the center of the annular permanent magnet stator 7 and in threaded engagement, while the opposite end portion 21b of the power output shaft 21 extends through the axial bore 4a in the bearing 4 and has a cross section which complements the cross section of the axial bore 4a in the bearing 4 so that the power output shaft 21 as a whole does not rotate about the longitudinal axis thereof, but can move in a direction parallel to the longitudinal axis thereof.

In the construction so far described, it is clear that the rotation of the rotor bosses 13 and 14 in the same direction about the power output shaft 21, in a manner as will be described later, is accompanied by a corresponding rotation of the sleeve 20 which subsequently causes the power output shaft 21 to move in a direction away from or in towards the motor assembly. Where the single hollow cylindrical member is employed instead of the separate rotor bosses 13 and 14 and sleeve 20, the inner peripheral surface of the hollow cylindrical member may have a helical thread extending over the entire length thereof.

The rotor bosses 13 and 14 carry respective rotors 18 and 19, each on one side of the permanent magnet stator 7, which respectively extend out from the ends of the corresponding rotor bosses 13 and 14 in a radially outward direction and are adjacent to the permanent magnet stator 7 above and below the permanent magnet stator 7 in parallel relation to the latter and terminate adjacent to the cylindrical walls of the upper and lower casings 5 and 6. These rotors 18 and 19 are rotatable together with the associated rotor bosses 13 and 14 and because of this relationship rotate together with the sleeve 20. The details of the rotors 18 and 19 will now be described with particular reference to FIG. 3. Since the rotors 18 and 19 have the same construction, only one of the rotors, for example, the rotor 18, will be described while elements of the rotor 19 similar to those of the rotor 18 will be designated by affixing to the reference numeral "19" alphabetic characters similar to those affixed to the reference numeral "18".

Referring particularly to FIGS. 1 and 3, the rotor 18 is made of a soft magnetic material and has the form of a flat disc having a central opening 18a through which said rotor 18 is rigidly mounted on the end of the corresponding rotor boss 13. The rotor 18 has an outer peripheral edge preferably bent to extend in a direction away from the permanent magnet stator 7 along the cylindrical wall of the upper casing 5, thereby providing an outer peripheral flange 18b. An annular body of the rotor 18 lying in a radial plane perpendicular to the power output shaft 21 and facing the adjacent magnetized surface of the permanent magnet stator 7 has a plurality of elongated openings 18c of high magnetic reluctance having a substantially L-shaped form and radially disposed and relatively alternately inverted in a circumferential direction to form pole teeth 18d and 18e. Each of the elongated openings 18c has the form of a slit or a groove and extends completely through the thickness of the rotor 18. The pole teeth 18e are integrally connected to each other at the inner edge of the annular body of the rotor 18 and extend outwardly in the radial plane perpendicular to the shaft 21 while the pole teeth 18d are integrally connected to each other at the outer periphery of the annular body of the rotor 18 through the flange 18b and extend inwardly in the radial plane perpendicular to the shaft 21. Bridges 18f and 18g across the ends of the respective elongated openings 18c are narrow enough to make any possible short circuit of magnetic flux therethrough negligible, i.e., to provide a high magnetic reluctance between any adjacent two of the pole teeth 18d and 18e, while keeping a sufficient mechanical strength for bridging the two adjacent pole teeth 18d and 18e. The number of the pole teeth 18d and 18e is equal to the number of north and south poles of the permanent magnet stator 7.

With the motor assembly so constructed as hereinbefore described, it will be seen that, when a commercial frequency voltage is applied to the exciting coils 9a and 10a, there are produced alternating magnetic fluxes by the electric current flowing through the exciting coils 9a and 10a, respectively. One of the magnetic fluxes generated in the exciting coil 9a forms a magnetic circuit including the upper casing 5, the center yoke member 11, the rotor boss 13 and the rotor 18 while the magnetic flux generated in the exciting coil 10a similarly forms a magnetic circuit including the lower casing 6, the center yoke member 12, the rotor boss 14 and the rotor 19. Accordingly, for each given half cycle of the commercial power supply voltage, the pole teeth 18d and 18e or 19d and 19e on each of the rotors 18 and 19 are magnetized simultaneously so as to be south and north poles respectively.

It is to be noted that, if the motion transmitting means and the suppressing means are omitted and the power output shaft is therefore, rotatable together with the rotors, the construction, function and application of the motor assembly is substantially identical to that disclosed in the U.S. Pat. No. 3,984,709. However, the motor assembly of the present invention is primarily used as a pulse controlled motor because of the particular limited application of the motor assembly of the present invention. Accordingly, the operation of the motor assembly of the construction shown in FIGS. 1 to 3 will now be described in its application as a pulse controlled motor, with reference to FIGS. 4 through 7.

It is further noted that, so the motor assembly of the present invention can be used as a pulse controlled motor, the rotors 18 and 19 should be positioned relative to each other so that the electrical angle between the respective pole teeth is 90° or the mechanical angle is 15° or an odd multiple thereof.

Figure 4:
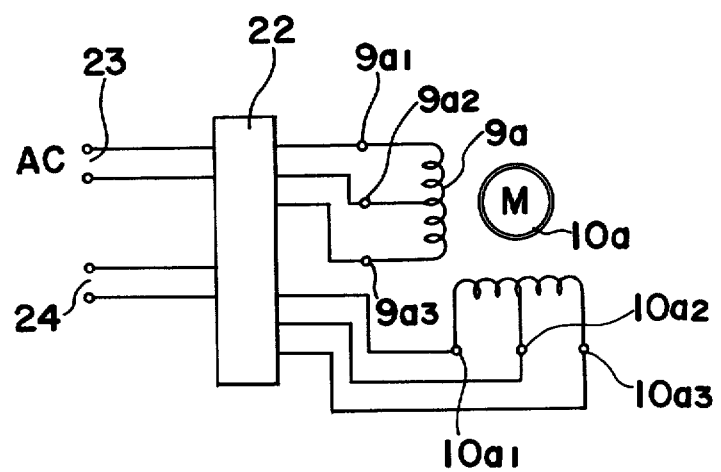
FIG. 4 is a circuit diagram showing the wiring of the exciting coils employed in the motor assembly shown in FIG. 1.

With the above in mind, the exciting coils 9a and 10a are electrically connected in a manner as shown in FIG. 4. More particularly, because of the presence of the intermediate tap, designated by $9a_2$ or $10a_2$, which extends from an intermediate point of the coil wire between the opposed ends $9a_1$ and $9a_3$ or $10a_1$ and $10a_3$ of each of the exciting coils 9a and 10a, each exciting coil 9a or 10a can be viewed as composed of two coils. In other words, the exciting coils 9a and 10a can be considered as having a total of four coils. The terminals $9a_1$, $9a_2$ and $9a_3$ of the exciting coil 9a and the terminals $10a_1$, $10a_2$ and $10a_3$ of the exciting coil 10a are electrically connected to a drive circuit 22 to which is connected electric power source 23 and a control signal source 24. The drive circuit 22 is designed so as to generate trains of pulses to be applied across the taps of the exciting coils 9a and 10a in accordance with the nature of the control signal applied thereto from the source 24. Examples of the waveforms of the train of pulses generated from the drive circuit 22 in response to the application of the control signal to said drive circuit 22 are illustrated in FIG. 5.

Figure 5:
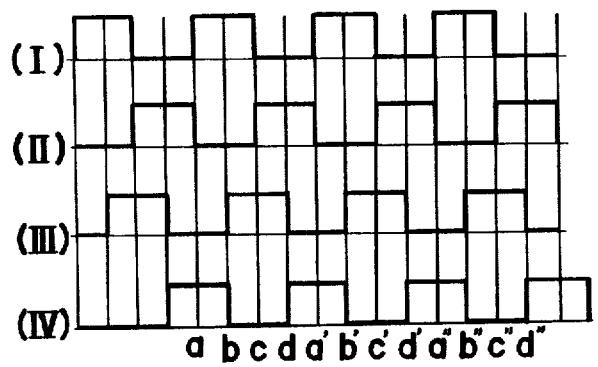
FIG. 5 is a diagram showing the waveforms of the input pulses to be applied to the motor assembly shown in FIG. 1.

In FIG. 5, (I) represents the waveform of a pulse voltage which is applied across the taps $9a_1$ and $9a_2$ of the exciting coil 9a, (II) represents the waveform of a pulse voltage which is applied across the taps $9a_2$ and $9a_3$ of the exciting coil 9a, (III) represents the waveform of a pulse voltage which is applied across the taps $10a_1$ and $10a_2$ of the exciting coil 10a, and (IV) represents the waveform of a pulse voltage which is applied across the taps $10a_2$ and $10a_3$ of the exciting coil 10a. Upon application of these pulse voltages to the exciting coils 9a and 10a, the pole teeth 18d and 18e of the rotor 18 and the pole teeth 19d and 19e of the rotor 19 are magnetized as shown in Table I. It is noted that Table I is based upon positive pulse voltages being applied. Where negative pluse voltages are applied, the polarities induced become reversed relative to those shown in Table I.

TABLE I

| When Voltage is Applied To: | Condition of Coils | Polarities Induced in Teeth | | | |
|---|---|---|---|---|---|
| | | 18d | 18e | 19d | 19e |
| Coil Between Taps $9a_1$ & $9a_2$ | Energized | N | S | | |
| Coil Between Taps $9a_2$ & $9a_3$ | Energized | S | N | | |
| Coil Between Taps $10a_1$ & $10a_2$ | Energized | | | N | S |
| Coil Between Taps $10a_2$ & $10a_3$ | Energized | | | S | N |

In FIG. 5, the operating regions are expressed on the abscissa and the critical points in the operation are represented by a, b, c, d. These critical points form respective operating regions such as region a-b, region b-c, region c-d, region d-a' and so on.

Based on Table I, the operation of the exciting coils and the magnetized conditions of the pole teeth are summarized as follows.

In region a-b: At the point a, a positive pulse voltage is applied across the taps $9a_1$ and $9a_2$ of the exciting coil 9a to induce north and south poles in the pole teeth 18d and 18e of the rotor 18, respectively, while a positive pulse voltage is already being applied across the taps $10a_2$ and $10a_3$ of the exciting coil 10a magnetizing the pole teeth 19d and 19e in south and north, respectively, until reaching point b.

In region b-c: The exciting coil 9a is kept energized across the taps $9a_1$ and $9a_2$ until reaching point c while a positive pulse voltage is applied to the exciting coil 10a is applied across the taps $10a_1$ and $10a_2$ to induce north and south poles in the pole teeth 19d and 19e of the rotor 19, respectively.

In region c-d: A pulse voltage is applied across the taps $9a_2$ and $9a_3$ of the exciting coil 9a to magnetize the pole teeth 18d and 18e of the rotor 18 as south and north, respectively, while the exciting coil 10a is kept energized across the taps $10a_1$ and $10a_2$ until reaching point d.

In region b-a': The exciting coil 9a is kept energized across the taps $9a_2$ and $9a_3$ until reaching point a', while an exciting positive pulse voltage is applied to the coil 10a across the taps $10a_2$ and $10a_3$ to magnetize the pole teeth 19d and 19e of the rotor 19 in a south and north orientation, respectively.

Thus the continuous energization of two of the four exciting coils and the repetition of the above described energizing process causes the rotors 18 and 19 to continually run. These operations are further summarized in Table II.

TABLE II

| Operational Regions | Conditions of Exciting Coils | | | | Polarities in Teeth | | | |
|---|---|---|---|---|---|---|---|---|
| | Coil Between Taps $9a_1$ & $9a_2$ | Coil Between Taps $9a_2$ & $9a_3$ | Coil Between Taps $10a_1$ & $10a_2$ | Coil Between Taps $10a_2$ & $10a_3$ | 18d | 18e | 19d | 19e |
| a-b | Energized | | | Energized | N | S | S | N |
| b-c | Energized | | Energized | | N | S | N | S |
| c-d | | Energized | Energized | | S | N | N | S |
| d-a' | | Energized | | Energized | S | N | S | N |
| a'-b' | Energized | | | Energized | N | S | S | N |
| b'-c' | Energized | | Energized | | N | S | N | S |

TABLE III

| Operational Regions | Conditions of Exciting Coils | | | | | | | |
|---|---|---|---|---|---|---|---|---|
| | Coil Between Taps $9a_1$ & $9a_2$ | Coil Between Taps $9a_2$ & $9a_3$ | Coil Between Taps $10a_1$ & $10a_2$ | Coil Between Taps $10a_2$ & $10a_3$ | 18d | 18e | 19d | 19e |
| a-b | | Energized | Energized | | S | N | N | S |
| b-c | Energized | | Energized | | N | S | N | S |

TABLE III-continued

| Operational Regions | Conditions of Exciting Coils | | | | 18d | 18e | 19d | 19e |
| --- | --- | --- | --- | --- | --- | --- | --- | --- |
| | Coil Between Taps 9a₁ & 9a₂ | Coil Between Taps 9a₂ & 9a₃ | Coil Between Taps 10a₁ & 10a₂ | Coil Between Taps 10a₂ & 10a₃ | | | | |
| c-d | Energized | | - | Energized | N | S | S | N |
| d-a' | | Energized | | Energized | S | N | S | N |
| a'-b' | | Energized | Energized | | S | N | N | S |
| b'-c' | Energized | | Energized | | N | S | N | S |

The operation of the magnetized pole teeth 18d and 18e of the rotor 18 and the pole teeth 19d and 19e of the rotor 19 is hereinafter described with reference to the operational diagrams of FIGS. 6(A) to (E), the pulse voltages as shown in FIG. 5 and the magnetized condition of the pole teeth as illustrated in Table II.

Figure 6:
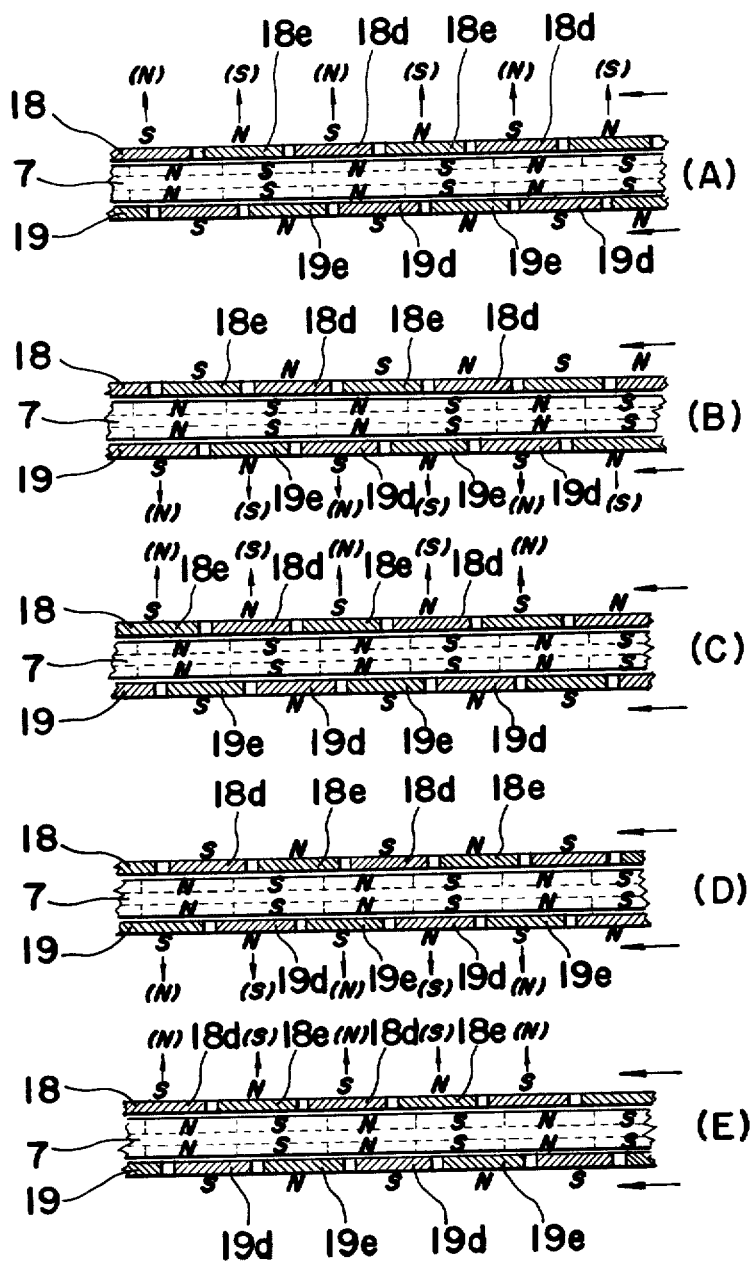
FIG. 6 is a schematic diagram showing the sequential positioning of the rotors relative to the permanent magnet stator of the motor assembly shown in FIG. 1, with the rotors being moved in one direction relative to the stator.

FIG. 6(A) shows the condition before reaching point a of FIG. 5 wherein the pole teeth 18d and 18e of the rotor 18 are magnetized in a south and north configuration, respectively, while the pole teeth 19d and 19e of the rotor 19 are also magnetized in a south and north configuration respectively. In this condition, the pole teeth 18d and 18e receive a repelling and an attracting force in the rightward direction as viewed in FIG. 6 and, on the other hand, the pole teeth 19d and 19e of the rotor 19 receive a repelling and an attracting force in the leftward direction. Accordingly, the rotor 18 and the rotor 19 which are fixed relative to each other through the sleeve 20 are in a dynamically balanced position and cannot move in either direction and the threaded sleeve 20 is held in a fixed position.

In the region a-b, a pulse voltage is applied across the taps 9a₁ and 9a₂ of the exciting coil 9a at point a and a pulse voltage is still being applied across the tap 10a₂ and 10a₃ of the exciting coil 10. The pole teeth 18d and 18e of the rotor 18, then, change their polarities to those in the parentheses in FIG. 6(A). As a result thereof, the rotor 18 advances in the leftward direction because of the attraction of the permanent magnet 7 and the rotor 19 rotates in the same direction due to the repelling of the permanent magnet 7 a distance equal to ½ of the pole pitch of the permanent magnet 7. The rotors 18 and 19 then reach dynamically balanced positions and stall in the positions as shown in FIG. 6(B).

In region b-c, the exciting coil 10a is deenergized between the taps 10a₂ and 10a₃, but energized by a pulse voltage which is newly applied across taps 10a₁ and 10a₂ while the exciting coil 9 is still being energized across the taps 9a₁ and 9a₂ at point b. The polarities of the pole teeth 19d and 19e of the rotor 19 are then changed to those in the parentheses as shown in FIG. 6(B). Accordingly, the rotor 18 then runs in the leftward direction due to the attraction of the permanent magnet 7 and the rotor 19 rotates in the same direction due to the repulsion of the permanent magnet 7 a further distance equal to ½ of the pole pitch of the permanent magnet 7 in to a dynamically balanced stable position wherein the rotors 18 and 19 stall as shown in FIG. 6(C).

In the region c-d, the exciting coil 9a is deenergized between taps 9a₁ and 9a₂, but energized by a pulse voltage which is newly applied across taps 9a₂ and 9a₃ at point c, while the exciting coil 10a is still being energized across taps 10a₁ and 10a₂ at point c so that the pole teeth 18d and 18e of the rotor 18 change their polarities to those shown in the parentheses in FIG. 6(C). Accordingly, the rotor 18 rotates in the leftward direction due to the repelling force of permanent magnet 7 and the rotor 19 rotates in the same direction because of attraction by the permanent magnet 7 by a further distance equal to ½ of the pole pitch of permanent magnet 7. At the new positions the rotors 18 and 19 stall in a dynamically balanced stable position as shown in FIG. 6(d).

In region d-a', the polarities of the rotor 19 are changed through a similar operation to those in parentheses as shown in FIG. 6(D) and the rotors 18 and 19 again advance a distance equal to ½ of the pole pitch of the permanent magnet 7 and again stall in dynamically balanced stable position as shown in FIG. 6(E). Likewise, the rotors 18 and 19 advance in the leftward direction step by step each time by a distance equal to ½ of the pole pitch of the permanent magnet 7.

Figure 7:
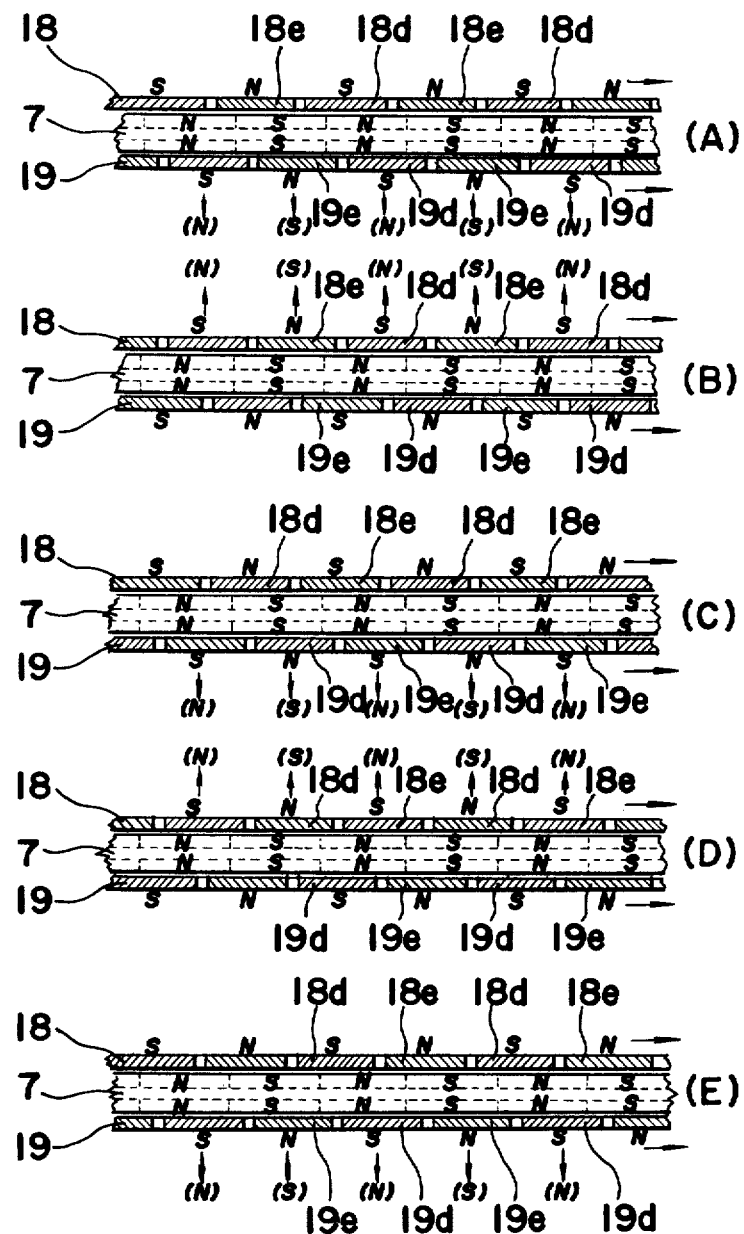
FIG. 7 is a diagram similar to FIG. 6, showing the rotors moving in the opposite direction relative to the stator.

In order to rotate the rotors 18 and 19 in the opposite, rightward direction as viewed in FIG. 7, the pulse voltage (III) of FIG. 5 is applied across the taps 9a₁ and 9a₂ of the exciting coil 9a and the pulse voltage (IV) is applied across the taps 9a₂ and 9a₂, while the pulse voltage (I) and the pulse voltage (II) are respectively applied across the taps 10a₁ and 10a₂ and the taps 10a₂ and 10a₃. The operation of energizing and magnetizing under these conditions is shown in Table III and the resultant operation of the rotors 18 and 19 is shown in FIGS. 7 (A) to (E).

Referring to Table III and FIGS. 7(A) to (E), in region a-b, the exciting coil 10a is deenergized between taps 10a₂ and 10a₃, but energized by a pulse voltage which is applied across taps 10a₁ and 10a₂, while the exciting coil 9a is being energized by a pulse voltage which is applied across taps 9a₂ and 9a₃ at point a. The polarities of the pole teeth 19d and 19e of the rotor 19 then change to those shown in parentheses in FIG. 7(A). As a result, the rotor 18 and the rotor 19 rotate in the rightward direction as viewed in FIG. 7 by a distance equal to ½ of the pole pitch of the permanent magnet 7. The rotors 18 and 19 than reach the dynamically balanced stable position and stall as shown in FIG. 7(B).

In region b-c, the exciting coil 9a is energized by a pulse voltage applied across taps 9a₁ and 9a₂, while the exciting coil 10a is energized by a pulse voltage applied across taps 10a₁ and 10a₂ at point b. The polarities of the pole teeth 18d and 18e of the rotor 18 then change to those shown in parentheses in FIG. 7(B). Accordingly, the rotor 18 and the rotor 19 advance and then stall in the position shown in FIG. 7(C).

In region c-d, the exciting coil 10a is energized by a pulse voltage which is applied across the taps 10a₂ and 10a₃, while the exciting coil 9a is being energized by a pulse voltage applied across taps 9a₁ and 9a₂ at point c, so that the polarities of the pole teeth 19d and 19e of the rotor 19 change to those shown in parentheses in FIG. 7(C). As a result, the rotors 18 and 19 rotate in the rightward direction and again stall in the position shown in FIG. 7(D).

In region d-a', the exciting coil 9a is energized by a pulse voltage applied across the taps 9a₂ and 9a₃ while exciting coil 10a is being energized by a pulse voltage applied across taps $10a_2$ and $10a_3$ at point d. The polarities of the pole teeth 18d and 18e of the rotor 18 then change to those in the parentheses as shown in FIG. 7(D). The rotors 18 and 19 are then caused to rotate rightwards to the position shown in FIG. 7(E). Thus, the rotors 18 and 19 continue to rotate step by step in the rightward direction the continous repetition of the previously described steps.

In the light of the foregoing description, the rotation of the rotor assembly, composed of the rotors 18 and 19 in the embodiment shown in FIGS. 1 to 3, of a two-phase pulse motor as shown in FIGS. 1 to 3 is achieved by applying one or more trains of pulses to the four exciting coils with the pulses being distributed from the drive circuit 22 in response to the control signal applied thereto from the control signal source 24 in accordance with a predetermined program which is set in the drive circuit 22. In this connection, it is noted that the control signal applied from the source 24 to the drive circuit 22 is not necessarily required to be a regular signal such as an AC sine-wave current or a constant and regular pulse signal. Even if the signal applied is variable the rotors 18 and 19 can still rotate through a predetermined angle, depending upon the number of the pulses applied, and stall in position for a predetermined period of time.

In the illustrated embodiment of the present invention, since the number of the pole teeth of each of the rotors 18 and 19 is 12, the rotor assembly can rotate through an angle of 15° per pulse applied. In other words, the angle of rotation of the rotor assembly per pulse applied is equal to 360°/(number of pole teeth of each rotor)/2. More particularly, with the number of the pole teeth on each rotor is 12 as described above, one step of rotation of the rotor assembly corresponds to 15° so that a total of 24 steps is required for the rotor assembly to complete a 360° rotation.

From the foregoing, it can be readily understood how the rotor assembly in the motor of the present invention rotates. Since the rotor assembly is fastened to the sleeve 20, rotation of the rotor assembly results in rotation of the sleeve 20 which is threadingly mounted on the power output shaft 21. This interaction results in a linear movement of the power output shaft 21 in the manner as hereinbefore described.

Assuming that the teeth of the thread 20a and, accordingly, those of the thread 21a, are pitched by 1.2 mm. and the number of pole teeth on each of the rotors 18 and 19 remains 12, one complete rotation of the rotor assembly (rotors 18 and 19) will cause the output shaft 21 to move linearly a distance equal to the pitch between two of each of the adjacent teeth of the thread 20a or 21a. Accordingly, in this example, one step of rotation of the rotor assembly causes a linear movement of the shaft 21 over a distance of 0.05 mm. In view of the above, it is clear that for a given thread pitch, the greater the number of the tooth poles on the rotor assembly, the smaller the distance of travel of the output shaft 21. On the other hand, for a given number of the pole teeth on the rotor assembly, the greater the thread pitch, the smaller the distance of travel of the output shaft 21.

Although the motor assembly of the present invention has been described for use as a pulse controlled motor, it is noted that the same motor can be used as a synchronous motor or a reversible motor, the operation of which is disclosed in the U.S. Pat. No. 3,984,709.

In addition, regardless of the type of use of the motor, various changes and modifications will become apparent to those skilled in the art. For example, the power output shaft may have its opposite ends extending outwardly from the motor housing in opposite directions with a substantially intermediate portion being threaded. In this case, another bearing similar to the bearing 4 may be provided on the bottom of the outer casing 2 to allow a corresponding end of the shaft to extend outwards.

Moreover, if one or both of the reduced ends 13a and 14a are long enough to protrude outwardly from the motor casing in parallel and coaxial relation to the power output shaft, the resultant motor assembly can be used concurrently for a double purpose, i.e. to move one driven element in a linear direction and also to move another driven element angularly about the power output shaft.

Accordingly, such changes and modifications are understood as being included within the scope of the present invention unless they depart therefrom.

We claim:

1. A miniature electric motor with a mechanism for converting rotational motion into linear motion, comprising:
   (a) a housing having a first and a second section;
   (b) a shaft movably supported in said housing for movement only axially thereof;
   (c) rotor members which are annular flat bodies supported within said housing in coaxial relation to said shaft;
   (d) an annular permanent magnet stator stationarily supported within said housing in coaxial relation to said shaft and magnetized for providing alternating north and south poles at equal angular spacings therearound;
   (e) annular exciting coil members supported within said housing in coaxial relation to said annular flat body rotor members;
   (f) yoke members made of magnetic material, said yoke members being positioned relative to said annular exciting coil members, said stator, and said annular flat body rotor members so that a magnetic flux generated by said annular exciting coil members when said annular exciting coil members are energized, forms a magnetic loop with said pole means for rotating said rotor in a predetermined direction about said shaft;
   (g) motion translating means located within said housing and interposed between said shaft and said rotor for transmitting said rotational motion of said annular flat body rotor members to said shaft to cause said shaft to undergo motion in a linear direction which is parallel to the longitudinal axis of said shaft, said motion translating means further comprising, said shaft having an helically threaded portion and an unthreaded portion, rotor boss members attached at each end thereto and having their interior helically threaded to engage said helically threaded portion of said shaft for causing said shaft to undergo said linear motion upon movement of said annular flat body rotor members;
   (h) linear motion means located at said first section of said housing for engaging with said unthreaded portion of said shaft for causing said shaft to move only axially in relation to said housing; and
   (i) a friction preventing sleeve member separate from said motion translating means and located in said second section of said housing and lining a space in said second section of said housing into which said shaft is displaced upon movement in one direction of said annular flat body rotor means for reducing wear due to friction upon contact of said shaft with said friction preventing sleeve member.

2. A miniature electric motor as claimed in claim 1, in which said rotor means comprises two rotors made of magnetic material, each having an annular flat body coaxial with said shaft and being rotatable about said shaft, and a plurality of pole means angularly spaced around said flat body of each of said rotors; and a pair of annular exciting coils supported within said housing in coaxial relation to each other and to said annular flat bodies of said respective rotors and wherein said rotors are positioned on opposite sides of said permanent magnet stator.

3. A miniature electric motor as claimed in claim 1, wherein said shaft has rotation suppression means for moving said shaft only in an axial direction and stop means for preventing said shaft from being linearly moved completely out of said casing.

4. A miniature electric motor as claimed in claim 1, wherein said rotors are rigidly mounted on opposite ends of said sleeve means for rotation together therewith.

5. A miniature electric motor as claimed in claim 1, wherein said friction preventing sleeve member is made of a soft material having a lubricant retaining capability for providing lubricant to said mechanism for converting rotational motion into linear motion.

* * * * *